(12) United States Patent
Park et al.

(10) Patent No.: US 8,993,676 B2
(45) Date of Patent: Mar. 31, 2015

(54) POLYLACTIC ACID RESIN AND COPOLYMER POLYESTER RESIN BLEND, AND MOLDED PRODUCT USING SAME

(71) Applicant: SK Chemicals Co., Ltd., Seongnam-si, Gyeonggi-do (KR)

(72) Inventors: Kyu-Tae Park, Suwon-Si (KR); Jong-Ryang Kim, Suwon-Si (KR); Jong-Wook Shin, Suwon-Si (KR); Min-Goo Kang, Deajeon (KR)

(73) Assignee: SK Chemicals Co., Ltd., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/357,261

(22) PCT Filed: Nov. 13, 2012

(86) PCT No.: PCT/KR2012/009530
§ 371 (c)(1),
(2) Date: May 9, 2014

(87) PCT Pub. No.: WO2013/073807
PCT Pub. Date: May 23, 2013

(65) Prior Publication Data
US 2014/0288241 A1    Sep. 25, 2014

(30) Foreign Application Priority Data

Nov. 18, 2011 (KR) .......................... 10-2011-0120883

(51) Int. Cl.
C08G 64/00    (2006.01)
C08L 67/04    (2006.01)
C08L 67/02    (2006.01)
C08G 63/02    (2006.01)

(52) U.S. Cl.
CPC ........ C08L 67/04 (2013.01); C08L 67/02 (2013.01)
USPC ........................... 525/173; 528/271; 528/272

(58) Field of Classification Search
USPC .................................. 525/173; 528/271, 272
See application file for complete search history.

(56) References Cited

FOREIGN PATENT DOCUMENTS

| | | |
|---|---|---|
| JP | 2004-099671 A | 4/2004 |
| JP | 2004-250549 A | 9/2004 |
| JP | 2005-336288 A | 8/2005 |
| JP | 2005-248117 A | 9/2005 |
| JP | 2010-081979 A | 4/2010 |
| KR | 2005-0056021 A | 6/2005 |

OTHER PUBLICATIONS

International Search Report of PCT/KR2012/009530, mailed Feb. 27, 2013.

*Primary Examiner* — Terressa Boykin
(74) *Attorney, Agent, or Firm* — Collard & Roe, P.C.

(57) ABSTRACT

A blend of polylactic acid resin and copolyester resin, which has excellent impact resistance and heat resistance, and a molded article manufactured using the same are disclosed. The blend of polylactic acid resin and copolyester resin, comprises 5 to 94 wt % of a polylactic acid resin; 3 to 92 wt % of a copolyester resin comprising a dicarboxylic acid component, which contains a terephthalic acid residue, and a diol component which contains 3 to 99 mol % of a cyclohexanedimethanol residue and 1 to 60 mol % of an isosorbide residue; and 3-30 wt % of a compatibilizer containing at least one reactive functional group selected from the group consisting of glycidyl, maleic anhydride, epoxy, isocyanate, amino, carboxylic acid and oxazoline groups, and mixtures thereof.

11 Claims, No Drawings

US 8,993,676 B2

POLYLACTIC ACID RESIN AND COPOLYMER POLYESTER RESIN BLEND, AND MOLDED PRODUCT USING SAME

CROSS REFERENCE TO RELATED APPLICATIONS

This application is the National Stage of PCT/KR2012/009530 filed on Nov. 13, 2012, which claims priority under 35 U.S.C. §119 of Korean Application No. 10-2011-0120883 filed on Nov. 18, 2011, the disclosure of which is incorporated by reference. The international application under PCT article 21(2) was not published in English.

FIELD OF THE INVENTION

The present invention relates to a blend of polylactic acid resin and copolyester resin, and more particularly to a blend of polylactic acid resin and copolyester resin, which has excellent impact resistance and heat resistance, and a molded article manufactured using the same.

BACKGROUND OF INVENTION

Polylactic acid (PLA) resin is a plant-derived resin obtained from plants such as corn, and is biodegradable. It is not derived from petroleum and emits less carbon dioxide gas and suppresses depletion of petroleum-based resources, unlike conventional petroleum-based resins, such as polystyrene resin, polyvinyl chloride (PVC) resin or polyethylene resin, and thus causes less environmental pollution, unlike petroleum-based plastic products. As environmental pollution caused by waste plastics and the like has caused social problems, efforts have been made to expand the application of polylactic acid to various fields, including food packing materials and containers, cases for electronic products, and the like, to which general plastics (petroleum-based resins) have been applied. However, the polylactic acid has poor impact resistance and heat resistance compared to conventional petroleum-based resins, and thus is used in limited applications.

In an attempt to overcome this problem of polylactic acid resin, methods of blending polylactic acid resin with those selected from among conventional petroleum-based plastic resins have been reported. For example, Korean Patent Laid-Open Publication No. 10-2005-0056021 discloses a method of improving the impact resistance of polylactic acid by blending polylactic acid with polycarbonate resin. However, in this case, if the content of polycarbonate resin (petroleum-based plastic resin) is increased in order to improve the impact resistance and heat resistance of polylactic acid, the content of hazardous bisphenol-A in the blend will be increased. As a result, the purpose of use of polylactic acid resin will not be achieved.

In addition, in the case in which polylactic acid resin is blended with a second resin in order to improve the impact resistance and heat resistance, if the second resin has low compatibility with the polylactic acid resin, the impact resistance and heat resistance of the polylactic acid resin can decrease rather than increase, or a blend having desired levels of impact resistance and heat resistance can be difficult to obtain.

SUMMARY OF THE INVENTION

Accordingly, it is an object of the present invention to provide a blend of polylactic acid resin and copolyester resin, which contains specific amounts or more of biomaterials (polylactic acid resin and isosorbide), and thus is environmentally friendly while having excellent heat resistance and impact resistance, and a molded article manufactured using the blend.

In order to achieve these objects, the present invention provides a blend of polylactic acid resin and copolyester resin, the blend comprising: 5 to 94 wt % of a polylactic acid resin; 3 to 92 wt % of a copolyester resin comprising a dicarboxylic acid component, which contains a terephthalic acid residue, and a diol component which contains 3 to 99 mol % of a cyclohexanedimethanol residue and 1 to 60 mol % of an isosorbide residue; and 3 to 30 wt % of a compatibilizer containing at least one reactive functional group selected from the group consisting of glycidyl, maleic anhydride, epoxy, isocyanate, amino, carboxylic acid and oxazoline groups, and mixtures thereof.

Also, the present invention provides molded article manufactured by molding a blend of polylactic acid resin and copolyester resin.

EFFECT OF THE INVENTION

As described above, the blend of polylactic acid resin and copolyester resin according to the present invention is prepared by blending a polylactic acid, a copolyester resin containing an isosorbide (bio-monomer) residue, and a compatibilizer serving to increase the compatibility between the polylactic acid resin and the copolyester resin. Thus, according to the present invention, deterioration in the physical properties of each of the resin components in the blend can be prevented, and the contents of biomaterials (polylactic acid resin and isosorbide residue) in the blend are maintained at specific levels even when the content of the copolyester resin in the blend is increased, suggesting that the blend of the present invention is environmentally friendly. Further, the blend of the present invention has a high content of the copolyester resin having high impact resistance and heat resistance, and thus has improved impact resistance and heat resistance. In addition, unlike other blends of petroleum-based resins, the blend of the present invention does not contain hazardous substances such as Bisphenol-A, and generates no bubbles when it is heat-molded, suggesting that a separate drying process is not required in a process of manufacturing molded articles from the blend. Moreover, the blend of the present invention can be molded at a relatively low temperature, and thus has advantages in terms of time and costs. In addition, the blend of polylactic acid resin and copolyester resin according to the present invention is useful as a material for manufacturing environment-friendly molded articles (sheets, packaging materials, containers, interior and exterior materials for electronic products, interior and exterior materials for automobiles, interior and exterior materials for buildings, etc.), particularly a material for beverage and food containers, medical containers, etc.

DETAILED DESCRIPTION OF THE INVENTION

A blend of polylactic acid resin and copolyester resin according to the present invention comprises: a polylactic acid (PLA) resin; a copolyester resin comprising isosorbide (bio-monomer); and a compatibilizer containing at least one reactive functional group selected from the group consisting of glycidyl, maleic anhydride, epoxy, isocyanate, amino, carboxylic acid and oxazoline groups, and mixtures thereof.

The polylactic acid that is used in the present invention is not specifically limited and may be a commercially available polylactic acid resin. The polylactic acid resin is generally prepared from a monomer derived from L-lactic acid and/or D-lactic acid and may also contain monomers other than L-lactic acid and D-lactic acid in amounts that do not impair the effect of the present invention. The polylactic acid resin can be prepared by various methods, but is typically prepared by ring-opening polymerization of a lactide prepared from lactic acid. In addition, it may also be prepared by direct polycondensation of lactic acid. A polylactic acid resin prepared from a monomer derived from each of L-lactic acid and D-lactic acid is crystalline and has high melting point. However, when a polylactic acid resin is prepared from the L-lactide, D-lactide and meso-lactide derived from L-lactic acid and D-lactic acid, the crystallinity and melting point of the polylactic acid can be easily controlled according to the contents of L-lactide, D-lactide and meso-lactide, and the content of each of the lactides can also be controlled according to the intended use of the polylactic acid resin.

In the blend of polylactic acid resin and copolyester resin according to the present invention, the content of the polylactic acid resin is 5 to 94 wt %, preferably 6 to 92 wt %, and more preferably 8 to 89 wt %. If the content of the polylactic acid resin is less than 5 wt %, the advantages of the polylactic acid resin, including excellent biodegradability, replacement of petroleum resources, and reduced emission of carbon dioxide gas, cannot be exhibited, and if the content is more than 92 wt %, the resulting blend will have poor heat resistance, and thus cannot be applied to various molded articles.

The number-average molecular weight of the polylactic acid resin is 10,000 to 500,000, and preferably 30,000 to 300,000. If the number-average molecular weight of the polylactic acid resin is less than 10,000, the resulting blend will have insufficient mechanical properties such as impact resistance, and if the number-average molecular weight is more than 500,000, the polylactic acid resin will be difficult to prepare (polymerize), and the processing thereof becomes difficult due to its excessively high molecular weight.

The copolyester resin that is used in the present invention serves to improve the impact resistance and heat resistance of the blend of polylactic acid resin and copolyester resin and is used to maintain the biomaterial content of the blend at a specific level (60 wt %) or higher. The copolyester resin is prepared by copolymerizing a dicarboxylic acid component containing a terephthalic acid residue with a diol component containing 3 to 99 mol % of a cyclohexanedimethanol residue and 1 to 60 mol % of an isosorbide residue represented by the following formula 1. Also, it has a structure in which an acid moiety, derived from the dicarboxylic acid component, and a diol moiety derived from the diol component are repeated.

[Formula 1]

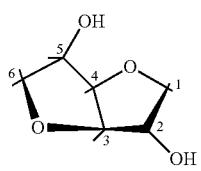

As used herein, the term "copolyester resin" means a synthetic polymer prepared by polycondensation of one or more difunctional carboxylic acids with one or more difunctional hydroxyl compounds. Generally, the difunctional carboxylic acid is dicarboxylic acid, and the difunctional hydroxyl compound is a divalent alcohol, for example, glycol or diol. As used herein, the term "residue" means a moiety or unit, which is contained in the product of a chemical reaction of a specific compound and derived from the specific compound. For example, each of the "dicarboxylic acid residue" and "diol (glycol) residue" means either a moiety derived from the dicarboxylic acid component of a polyester formed by esterification or copolymerization or a moiety derived from the diol component of the polyester. Specifically, it means a residue remaining after removal of hydrogen, a hydroxyl group or an alkoxy group from a general polyester comprising a dicarboxylic acid and a diol (glycol) component. Thus, the dicarboxylic acid residue may be derived from a dicarboxylic acid monomer or its acid halide, an ester (e.g., a lower alkyl ester having 1 to 4 carbon atoms ($C_{1-4}$ lower alkyl ester) such as monomethyl, monoethyl, dimethyl, diethyl or dibutyl ester), a salt, an anhydride, or a mixture thereof. Thus, as used herein, the term "dicarboxylic acid", "terephthalic acid", etc. is meant to include a dicarboxylic acid and any derivative of the dicarboxylic acid, including its associated acid halides, esters, half-esters, salts, half-salts, anhydrides, mixed anhydrides, and mixtures thereof, which are useful in a reaction with a dial to make a polyester.

The dicarboxylic acid component of the copolyester resin comprises a terephthalic acid residue in an amount of 50 to 100 mol %, for example, 60 to 99.9 mol %, specifically 90 to 99.9 mol %, based on the total moles of the dicarboxylic acid component, and to improve the physical properties of the polyester resin, may comprise 0 to 50 mol %, for example, 0.1 to 40 mol %, specifically 0.1 to 10 mol %, of dicarboxylic residues, including $C_{8-14}$ aromatic dicarboxylic acid residues (excluding terephthalic acid residues), $C_{4-12}$ aliphatic acid residues, or mixtures thereof. Examples of aromatic dicarboxylic acids capable of forming the aromatic dicarboxylic acid residue include aromatic dicarboxylic acids which are generally used in the preparation of polyester resins, for example, isophthalic acid (excluding terephthalic acid), naphthalene dicarboxylic acid such as 2,6-naphthalene dicarboxylic acid, diphenyl dicarboxylic acid, etc. Examples of aliphatic dicarboxylic acids capable of forming the aliphatic dicarboxylic acid residue include linear, branched or cyclic aliphatic dicarboxylic acid components which are conventionally used for producing polyester resin, for example, cyclohexane dicarboxylic acid such as 1,4-cyclohexane dicarboxylic acid and 1,3-cyclohexane dicarboxylic acid, phthalic acid, sebacic acid, succinic acid, isodecylsuccinic acid, maleic acid, fumaric acid, adipic acid, glutaric acid, azelaic acid, and so on. In the case in which the copolyester resin contains a dicarboxylic acid residue (comonomer) excluding terephthalic acid residue, if the content of the dicarboxylic acid residue is too low or high, the effect of improving the physical properties of the blend will be insufficient or the physical properties of the polyester resin can decrease rather than increase.

The diol component of the copolyester resin includes (i) 3 to 99 mol %, preferably 5 to 91 mol % of a cyclohexanedimethanol (1,2-cyclohexanedimethanol, 1,3-cyclohexanedimethanol, 1,4-cyclohexanedimethanol, etc.) residue and (ii) 1 to 60 mol %, preferably 4 to 40 mol % of an isosorbide residue with respect to the diol component, wherein the contents of the cyclohexanedimethanol residue and the isosorbide residue are within the ranges satisfying the following equation 1:

0.0012(CHDM mol %)$^2$−0.2401(CHDM mol %)+11.136≤ISB mol %≤−0.0122(CHDM mol %)$^2$+0.0243(CHDM mol %)+79.846    [Equation 1]

wherein ISB mol % represents the content of the isosorbide residue, and CHDM mol % represents the content of the cyclohexanedimethanol residue.

In addition, the diol component of the copolyester resin includes 0 to 94 mol %, preferably 0.1 to 88 mol %, more preferably 0.1 to 80 mol % of $C_{2-20}$, preferably $C_{2-12}$ aliphatic diol residues (excluding cyclohexanedimethanol and isosorbide residues). Examples of diols capable of forming the aliphatic diol residue include linear, branched cyclic aliphatic diols, including ethylene glycol, diethylene glycol, triethylene glycol, propanediol (1,2-propanediol, 1,3-propanediol, etc.), 1,4-butanediol, pentanedial, hexanediol (1,6-hexanediol, etc.), neopentyl glycol (2,2-dimethyl-1,3-propanediol), 1,2-cyclohexanediol, 1,4-cyclohexanediol, and tetramethylcyclobutanediol, preferably ethylene glycol.

If the content of the cyclohexanedimethanol residue in the diol component of the copolyester resin is less than 3 mol % based on the total weight of the dial component, the impact resistance of the copolyester resin will be insufficient, and if the content is more than 99 mol %, the heat resistance of the copolyester resin will be insufficient, because the content of the isosorbide residue is less than 1 mol %. If the content of the isosorbide residue is less than 1 mol % based on the total amount of the diol component, the heat resistance of the resulting copolyester resin will be insufficient, and if the content is more than 60 mol %, yellowing of the copolyester resin can occur. Also, if the content of the diol residue (excluding cyclohexanedimethanol and isosorbide residues) is more than 94 mol % based on the total amount of the dial component, the physical properties of the copolyester resin will be poor.

A 3.2-mm thick specimen prepared from the copolyester resin preferably shows a notched Izod impact strength of 50 J/m or more, as measured in accordance with the ASTM D256 method at 23° C. On the other hand, a polyester resin obtained by copolymerizing ethylene glycol with isosorbide alone generally shows a notched Izod impact strength of 50 J/m or less. When the copolyester resin is annealed at 300° C. for 5 minutes and cooled to room temperature, followed by scanning at a heating rate of 10° C./min, the copolyester resin preferably has a glass transition temperature (Tg) of 90° C. or higher. Also, the copolyester resin has an intrinsic viscosity of 0.35 dl/g or higher, preferably 0.40 dl/g or higher, more preferably 0.45 dl/g or higher, as measured at 35° C. at a concentration of 1.2 g/dl in orthochlorophenol (OCP). The copolyester resin is environmentally friendly and has excellent heat resistance and impact resistance. Thus, when the copolyester resin is blended with the above polylactic acid resin, it can improve the impact resistance and heat resistance of the polylactic acid resin.

In the blend of polylactic acid resin and copolyester resin according to the present invention, the content of the copolyester resin is 3 to 92 wt %, preferably 4 to 90 wt %, and more preferably 6 to 87 wt %. If the content of the copolyester resin is less than 3 wt %, the effect of increasing the heat resistance and impact resistance of the polylactic acid resin will not appear, and if the content of the copolyester resin is more than 92 wt %, the advantages of the polylactic acid resin, including biodegradability, replacement of petroleum resources, and reduced emission of carbon dioxide gas, will not be exhibited.

The weight-average molecular weight (Mw) of the copolyester resin is, for example, 10,000 to 200,000 (g/mol), preferably 20,000 to 100,000 (g/mol). If the weight-average molecular weight (Mw) of the copolyester resin is out of the above range, the processability or physical properties of the blend can be reduced.

The copolyester resin can be prepared according to a conventional method. For example, it can be prepared by a method comprising the steps of: (1) esterifying the dicarboxylic acid with the dial compound; and (2) subjecting the esterification product to polycondensation. Specifically, the step of esterifying the dicarboxylic acid with the dial compound can be carried out by esterifying or transesterifying the dicarboxylic acid with the diol compound at a pressure of 0 to 10.0 kg/cm² and a temperature of 150 to 300° C. for 1 to 24 hours. The conditions of the esterification reaction can be suitably controlled according to the specific properties of the resulting copolyester, the molar ratio between the dicarboxylic acid component and the diol (glycol) component, process conditions, etc. Specifically, the esterification reaction is preferably carried out under the conditions of pressure of 0 to 5.0 kg/cm², more preferably 0.1 to 3.0 kg/cm², temperature of 200 to 270° C., more preferably 240 to 260° C., and reaction time of 1 to 15 hours, more preferably 2 to 8 hours. The molar ratio between the dicarboxylic acid component and the diol component, which participate in the esterification reaction, may be 1:1.05 to 1:3.0. For example, the dicarboxylic acid component and the diol component may be added such that the content of cyclohexanedimethanol is 10 to 90 parts by weight, preferably 20 to 80 parts by weight, based on 100 parts by weight of the dicarboxylic acid component. The molar ratio of the diol component to the dicarboxylic acid component is less than 1.05, unreacted dicarboxylic acid will remain after polymerization and reduce the transparency of the resin, and if the molar ratio is more than 3.0, the polymerization rate will be reduced or the productivity of the resin will be reduced. In order to increase the rate of the esterification reaction and the productivity of the resin, a catalyst may be optionally used. Also, the esterification reaction can be carried out batchwise or continuously, and the raw materials may be added separately, but are preferably added in the form of a slurry obtained by adding the dicarboxylic acid component to the diol component. In addition, for the second polyester, a slurry can be made by dissolving the diol component (such as solid isosorbide) in water or ethylene glycol at room temperature and mixing the solution with the dicarboxylic acid component such as terephthalic acid. Further, water may additionally be added to the slurry composed of the mixture of the dicarboxylic acid component, the diol component (such as isosorbide) and ethylene glycol to increase the solubility of isosorbide. In addition, the slurry may also be prepared at a temperature of 60° C. or higher to provide a slurry containing isosorbide melted therein.

Meanwhile, the step of subjecting the esterification product to polycondensation can be carried out by subjecting the product of esterification of the dicarboxylic acid component with the diol component to polycondensation at a temperature of 150 to 300° C. under a reduced pressure of 400 to 0.01 mmHg for 1 to 24 hours. This polycondensation reaction may preferably be carried out at a temperature of 200 to 290° C., more preferably 260 to 280 under a reduced pressure of 100 to 0.05 mmHg, more preferably 10 to 0.1 mmHg. When the polycondensation reaction is carried out under reduced pressure, glycol, a byproduct of the polycondensation reaction, can be removed, but if the polycondensation reaction is carried out under a pressure out of the range of 400 to 0.01 mmHg, removal of the byproduct can be insufficient. Also, if the polycondensation reaction is carried out at a temperature out of the range of 150 to 300° C., the physical properties of the resulting polyester can be deteriorated. The polycondensation reaction can be carried out for a sufficient time, for example, an average retention time of 1 to 24 hours, until the intrinsic viscosity of the final reaction product reaches a suitable level. Preferably, the polycondensation reaction can be carried out until a vacuum level of less than 2.0 mmHg is reached, and the esterification reaction and the polycondensation reaction can be carried out in an atmosphere of inert gas.

In the preparation of the polyesters, additives, such as polycondensation catalysts, stabilizers or coloring agents, may be used. These additives such as polycondensation catalysts or stabilizers may be added to the esterification or transesterification product before initiation of the polycondensation reaction. Alternatively, these additives may be added to the slurry comprising the dicarboxylic acid and diol compounds before the esterification reaction or during the esterification reaction.

The polycondensation catalyst that may be used in the present invention may be selected from among a titanium-based compound, a germanium-based compound, an antimony-based compound, an aluminum-based compound, a tin-based compound, and mixtures thereof. Examples of the titanium-based compound include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide co-precipitates, titanium dioxide/zirconium dioxide co-precipitates, etc. Examples of the germanium-based compound include germanium dioxide ($GeO_2$), germanium tetrachloride ($GeCl_4$), germanium ethyleneglycoxide, germanium acetate, co-precipitates thereof, and mixtures thereof.

The stabilizer that may be used in the present invention may be a phosphorus-based compound, such as phosphoric acid, trimethyl phosphate or triethyl phosphate, and may be added in an amount of 10 to 100 ppm (on the basis of element phosphorus) relative to the weight of the resulting polymer (copolyester resin). If the amount of stabilize added is less than 10 ppm, the stabilization effect will be insufficient and can cause yellowing of the final product. On the other hand, if the amount of stabilizer added is more than 100 ppm, a polymer having a high degree of polymerization cannot be obtained.

The coloring agent that may be used in the present invention is added in order to improve the color of polymers and may be a conventional coloring agent, such as cobalt acetate or cobalt propionate. If necessary, a coloring agent based on an organic compound may also be used. The coloring agent may be added in an amount of 0 to 100 ppm based on the weight of the final polymer (copolyester resin).

The compatibilizer that is used in the present invention contains at least one reactive functional group selected from the group consisting of glycidyl, maleic anhydride, epoxy, isocyanate, amino, carboxylic acid and oxazoline groups, and mixtures thereof. The compatibilizer may react with the ends of the polylactic acid resin and the copolyester resin, that is, carboxylic acid (—COOH) and hydroxyl group (—OH)), to increase the compatibility between the polylactic acid resin and the copolyester resin. In addition, it can enhance the impact resistance of the blend according to either the molecular structure bonded with the functional group or the structure of the main chain. As the compatibilizer, any compound may be used without limitation, as long as it contains the above-described reactive functional group. Examples of the compatibilizer include, but are not limited thereto, adipic acid, hexamethlylene diamine, epoxy-based compounds, PPDI (p-phenylene diisocyanate), HDI (1,6-hexamethylene diisocyanate), TDI (toluene diisocyanate), NDI (1,5-naphthalene diisocyanate), IPDI (isoporon diisocyanate), MDI (4,4-diphenylmethane diisocyanate), H12MDI (cyclohexylmethane diisocyanate), ethylene-glycidylmetacrylate, ethylene-glycidylacrylate, ethylene-acrylic ester-glycidyl acrylate, ethylene-acrylic ester-glycidyl methacrylate, reactive polystylene, epocros, and mixtures thereof.

The content of the compatibilizer is 3 to 30 wt %, preferably 4 to 25 wt %, and more preferably 5 to 20 wt %, based on the total weight of the blend. If the content of the compatibilizer is less than 3 wt %, the effect of increasing compatibility will not be obtained and the impact resistance and heat resistance of the blend will be insufficient, and if the content is more than 30 wt %, the heat resistance of the blend will be reduced or the flowability of the blend will be reduced so that the processability of the blend in processes such as injection or extrusion can be reduced.

The blend of polylactic acid resin and copolyester resin according to the present invention may, if necessary, contain one or more other resin components (e.g., polycarbonate, polyethylene, polypropylene, polymethacrylate, etc.) and additive components in an amount of, for example, 1 to 30 parts by weight based on 100 parts by weight of the blend.

Examples of additives that may be added to the blend include stabilizers having the ability to maintain the physical properties of the blend during processing, store and use, for example, oxidation stabilizers, heat stabilizers, light stabilizers or UV stabilizers. In addition, nucleating agents, chain extenders, lubricants, impact modifiers, colorants, wax, mold-releasing agents, aromatics, foaming agents, plasticizers, hydrolysis inhibitors, non-reactive materials and reactive materials may be used for the processing, storage and use of the blend. The above additives are selected depending on the intended use of the blend and are not limited to those mentioned above.

The blend of polylactic acid resin and copolyester resin according to the present invention can be prepared by any conventional blending process, and may be molded by a molding process such as injection, extrusion or compounding. Specifically, the blend may be extrusion- or injection-molded immediately after blending. Alternatively, the blend may be compounded, extruded, cooled and pelletized, followed by crystallization, and the obtained pellet-type blend chip may be used for extrusion or injection molding purposes.

A 3.0-mm thick specimen prepared from the blend of polylactic acid resin and copolyester resin according to the present invention shows a notched Izod impact strength of 30 J/m or more, preferably 50 J/m or more, as measured in accordance with the ASTM D256 method at 23° C.

The blend of polylactic acid resin and copolyester resin according to the present invention can be molded a conventional molding process known in the art, for example, injection, extrusion, extrusion blow, injection blow or profile injection, and post-processing such as a heat molding process, and may, if necessary, be prepared into suitable molded articles, for example, fibers, injection-molded articles, sheets or films.

EMBODIMENTS

Hereinafter, the present invention will be described in further detail with reference to comparative examples and comparative examples. It is to be understood, however, that these examples are for illustrative purposes only and are not intended to limit the scope of the present invention. In the following examples and comparative examples, the performance of polymers (blends) was evaluated in the following manner.

(1) Heat resistance (heat distortion temperature (HDT)): a specimen having a size of 127 mm×13 mm×3 to 13 mm was prepared using the above blend, and the heat distortion temperature or heat deflection temperature (HDT) of the specimen was measured in accordance with the ASTM D648 method at a pressure of 0.455 MPa.

(2) Notched Izod impact strength: a 3.0 mm thick specimen was prepared using the above blend, and the notched Izod impact strength of the specimen was measured in accordance with ASTM D256 at 23° C.

(3) Presence or absence of bubbles after heat molding: the above blend was heat-molded using a Gaiss heat molding machine at 130° C. to make a plate having an "SK"-shaped mark, and the presence or absence of bubbles on the plate was visually observed.

(4) Examination of whether the blend contains a harmful substance: the presence and content of a hazardous substance (bisphenol-A, etc.) in the blend was examined by nuclear magnetic resonance (NMR).

Preparation Example 1

Preparation of Copolyester Resin 6 moles of terephthalic acid 138 g of 1,4-cyclohexanemethanol, 313 g of ethyleneglycol and 105 g of isosorbide based on as a dicarboxylic acid component and 6 moles of terephthalic acid as a diol component were mixed with each other in a 3-L reactor equipped with a stirrer and a reflux condenser while they were heated slowly to 255° C. so that they were subjected to esterification. The generated water was discharged from the system, and after completion of the generation and discharge of water, the reaction product was transferred into a polycondensation reactor equipped with a stirrer, a cooling condenser and a vacuum system. Suitable amounts of a catalyst, a stabilizer and a colorant were added to the esterification product, after which the internal temperature of the reactor was increased to 240° C.~275° C. while the internal pressure of the reactor was reduced from atmospheric pressure to 50 mmHg for 40 minutes to discharge ethylene glycol, and then reduced slowly to a high vacuum level of 0.1 mmHg. At that temperature and pressure, the esterification product was subjected to polycondensation until it reached a desired intrinsic viscosity, thereby preparing a copolyester resin. The prepared resin had a weight-average molecular weight (Mw) of 63,000 (g/mol) and an intrinsic viscosity of 0.76 (dl/g).

Preparation Example 2

Preparation of Copolyester Resin

A copolyester resin was prepared in the same manner as Example 1, except that, 6 moles of terephthalic acid as an acid component and 565 g of 1,4-cyclohexanemethanol, 96 g of ethyleneglycol and 789 g of isosorbide based on 6 moles of terephthalic acid as a diol component were used. The prepared copolyester resin had a weight-average molecular weight (Mw) of 37,000 (g/mol) and an intrinsic viscosity of 0.65 (dl/g).

Example 1

Preparation and Evaluation of Polylactic Acid Resin/Copolyester Resin Blend 10 wt % of polylactic acid chips having a number-average molecular weight of 100,000, and 87 wt % of the copolyester resin chips prepared in Preparation Example 1, and 3 wt % of an ethylene-based reactive terpolymer (ethylene-acrylic ester-glycidyl methacrylate) containing about 8% of a glycidyl reactive group in the main chain were placed in a Haake compounding machine and blended with each other at a cylinder temperature of 260° C. and a die temperature of 255° C. and a screw speed of 50 rpm, thereby preparing a pellet-type blend of polylactic acid resin and copolyester resin. Using the above-described methods, the blend was measured for the heat distortion temperature, the notched Izod impact strength, the presence and absence of bubbles after heat molding, and the presence and absence of a harmful substance, and the results of the measurement are shown in Table 1 below.

Example 2

Preparation and Evaluation of Polylactic Acid Resin/Copolyester Resin Blend

A pellet-type blend of polylactic acid resin and copolyester resin was prepared in the same manner as Example 1, except that 40 wt % of polylactic acid chips having a number-average molecular weight of 100,000, and 50 wt % of the copolyester resin chips prepared in Preparation Example 1, and wt % of an ethylene-based reactive terpolymer (ethylene-acrylic ester-glycidyl methacrylate) containing about 8% of a glycidyl reactive group in the main chain were used. The prepared blend was measured for the heat distortion temperature, the notched Izod impact strength, the presence and absence of bubbles after heat molding, and the presence and absence of a harmful substance, and the results of the measurement are shown in Table 1 below.

Example 3

Preparation and Evaluation of Polylactic Acid Resin/Copolyester Resin Blend

A pellet-type blend of polylactic acid resin and copolyester resin was prepared in the same manner as Example 1, except that 75 wt % of polylactic acid chips having a number-average molecular weight of 100,000, and 15 wt % of the copolyester resin chips prepared in Preparation Example 1, and wt % of an ethylene-based reactive terpolymer (ethylene-acrylic ester-glycidyl methacrylate) containing about 6% of a glycidyl reactive group in the main chain were used. The prepared blend was measured for the heat distortion temperature, the notched Izod impact strength, the presence and absence of bubbles after heat molding, and the presence and absence of a harmful substance, and the results of the measurement are shown in Table 1 below.

Example 4

Preparation and Evaluation of Polylactic Acid Resin/Copolyester Resin Blend

A pellet-type blend of polylactic acid resin and copolyester resin was prepared in the same manner as Example 1, except that 5 wt % of polylactic acid chips having a number-average molecular weight of 100,000, and 90 wt % of the copolyester resin chips prepared in Preparation Example 2, and 5 wt % of an ethylene-based reactive terpolymer (ethylene-acrylic ester-glycidyl methacrylate) containing about 6% of a glycidyl reactive group in the main chain were used. The prepared blend was measured for the heat distortion temperature, the notched Izod impact strength, the presence and absence of bubbles after heat molding, and the presence and absence of a harmful substance, and the results of the measurement are shown in Table 1 below.

Comparative Example 1

Preparation and Evaluation of Pellet-Type Polylactic Acid Resin

A pellet-type polylactic acid resin was prepared in the same manner as Example 1, except that the copolyester resin and the ethylene-based reactive terpolymer containing about 8% of a glycidyl reactive group in the main chain. The prepared resin was measured for the heat distortion temperature, the notched Izod impact strength, the presence and absence of bubbles after heat molding, and the presence and absence of a harmful substance, and the results of the measurement are shown in Table 1 below.

Comparative Example 2

Preparation and Evaluation of Polylactic Acid Resin/Polycarbonate Resin Blend 30 wt % of polylactic acid chips having a number-average molecular weight of 100,000, and 70 wt % of polycarbonate resin (PC) chips were placed in a Haake compounding machine and blended with each other at a cylinder temperature of 260° C. and a die temperature of 255° C. and a screw speed of 50 rpm, thereby preparing a pellet-type blend of polylactic acid resin and polycarbonate resin. Using the above-described methods, the prepared blend was measured for the heat distortion temperature, the notched Izod impact strength, the presence and absence of bubbles after heat molding, and the presence and absence of a harmful substance, and the results of the measurement are shown in Table 1 below.

Comparative Example 3

Preparation and Evaluation of Polylactic Acid Resin/Polycarbonate Resin Blend

A pellet-type blend of polylactic acid resin and polycarbonate resin was prepared in the same manner as Comparative Example 2, except that 70 wt % of polylactic acid chips having a number-average molecular weight of 100,000, and wt % of polycarbonate resin (PC) chips were used. The prepared blend was measured for the heat distortion temperature, the notched Izod impact strength, the presence and absence of bubbles after heat molding, and the presence and absence of a harmful substance, and the results of the measurement are shown in Table 1 below.

Comparative Example 4

Preparation and Evaluation of Polylactic Acid Resin/Copolyester Resin Blend

A pellet-type blend of polylactic acid resin and polycarbonate resin was prepared in the same manner as Comparative Example 2, except that 40 wt % of polylactic acid chips having a number-average molecular weight of 100,000, and 60 wt % of the copolyester resin chips prepared in Preparation Example 1 were used. The prepared blend was measured for the heat distortion temperature, the notched Izod impact strength, the presence and absence of bubbles after heat molding, and the presence and absence of a harmful substance, and the results of the measurement are shown in Table 1 below.

Comparative Example 5

Preparation and Evaluation of Polylactic Acid Resin/Copolyester Resin Blend

A pellet-type blend of polylactic acid resin and polycarbonate resin was prepared in the same manner as Comparative Example 2, except that 75 wt % of polylactic acid chips having a number-average molecular weight of 100,000, and 25 wt % of the copolyester resin chips prepared in Preparation Example 1 were used. The prepared blend was measured for the heat distortion temperature, the notched Izod impact strength, the presence and absence of bubbles after heat molding, and the presence and absence of a harmful substance, and the results of the measurement are shown in Table 1 below.

TABLE 1

|  | Example 1 | Example 2 | Example 3 | Example 4 | Comp. Example 1 | Comp. Example | Comp. Example 3 | Comp. Example 4 | Comp. Example 5 |
|---|---|---|---|---|---|---|---|---|---|
| Heat distortion temperature (° C.) | 79 | 75 | 55 | 80 | 50 | 110 | 90 | 49 | 52 |
| Izod impact strength (J/m) | 113 | 87 | 70 | 140 | 33 | 100 | 50 | 27 | 29 |
| Presence or absence of bubbles after heat molding | Absence | Absence | Absence | Absence | Absence | Presence | Presence | Absence | Absence |
| Presence or absence of harmful substance | Absence | Absence | Absence | Absence | Absence | Presence | Presence | Absence | Absence |
| Content (wt %) of biomaterial | 25.5 | 46.0 | 76.8 | 21.2 | 100 | 30.0 | 70.0 | 47.2 | 78.0 |

As can be seen in Table 1 above, the blend of polylactic acid resin and copolyester resin according to the present invention contains the compatibilizer, and thus shows a high heat distortion temperature of 55 to 80° C. and a high notched Izod impact strength of 70 to 140 J/m, compared to those of Comparative Examples 4 and 5 in which no compatibilizer was used. In addition, the blend of the present invention generates no bubbles after heat molding, and thus a separate molding process is not required in a process of manufacturing molded articles (sheets, etc.) from the blend, suggesting that the blend of the present invention has advantages in terms of time and costs. In addition, the blend of the present invention contains no hazardous substance (Bisphenol-A, etc.), suggesting that it is environmentally friendly.

What is claimed is:

1. A blend of polylactic acid resin and copolyester resin, the blend comprising:
   5 to 94 wt % of a polylactic acid resin;
   3 to 92 wt % of a copolyester resin comprising a dicarboxylic acid component, which contains a terephthalic acid residue, and a diol component which contains 3 to 99 mol % of a cyclohexanedimethanol residue and 1 to 60 mol % of an isosorbide residue; and
   3 to 30 wt % of a compatibilizer containing at least one reactive functional group selected from the group consisting of glycidyl, maleic anhydride, epoxy, isocyanate, amino, carboxylic acid and oxazoline groups, and mixtures thereof.

2. The blend of claim 1, wherein the blend of polylactic acid resin and copolyester resin has a notched Izod impact strength of 30 J/m or more, as measured in accordance with ASTM D256 at 23° C.

3. The blend of claim 1, wherein the polylactic acid resin has a number-average molecular weight of 10,000 to 500,000.

4. The blend of claim 1, wherein the dicarboxylic acid component further contains 0 to 50 mol % of at least one dicarboxylic acid residue selected from the group consisting of $C_{8-14}$ aromatic dicarboxylic acid residues, $C_{4-12}$ aliphatic dicarboxylic acid residues, and mixtures thereof.

5. The blend of claim 1, wherein the cyclohexanedimethanol residue is selected from the group consisting of 1,2-cyclohexanedimethanol, 1,3-cyclohexanedimethanol, 1,4-cyclohexanedimethanol, and mixtures thereof.

6. The blend of claim 1, wherein the content of the isosorbide residue (ISB mol %) and the content of the cyclohexanedimethanol residue (CHDM mol %) are within the ranges satisfying the following equation 1:

$$0.0012(\text{CHDM mol \%})^2 - 0.2401(\text{CHDM mol \%}) + 11.136 \leq \text{ISB mol \%} - 0.0122(\text{CHDM mol \%})^2 + 0.0243(\text{CHDM mol \%}) + 79.846.$$ [Equation 1]

7. The blend of claim 1, wherein the diol component contains 8 to 91 mol % of the cyclohexanedimethanol residue and 4 to 40 mol % of the isosorbide residue.

8. The blend of claim 1, wherein the diol component further contains 0 to 94 mol % of one or more $C_{2-20}$ aliphatic diol residues (excluding the cyclohexanedimethanol residue and the isosorbide residue).

9. The blend of claim 8, wherein the aliphatic diol residues are selected from the group consisting of ethylene glycol, diethylene glycol, triethylene glycol, propanediol, 1,4-butanediol, pentanediol, hexanediol, neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, tetramethylcyclobutanediol, and mixtures thereof.

10. The blend of claim 1, wherein the content of the cyclohexanedimethanol residue is 10 to 90 parts by weight based on 100 parts by weight of the dicarboxylic acid component.

11. A molded article manufactured by molding a blend of polylactic acid resin and copolyester resin according to claim 1.

* * * * *

UNITED STATES PATENT AND TRADEMARK OFFICE
CERTIFICATE OF CORRECTION

PATENT NO.        : 8,993,676 B2                                   Page 1 of 1
APPLICATION NO.   : 14/357261
DATED             : March 31, 2015
INVENTOR(S)       : Park et al.

It is certified that error appears in the above-identified patent and that said Letters Patent is hereby corrected as shown below:

In the Claims

In particular, in Column 14, line 8 (Line 6 in Claim 6), after "ISB mol%" please insert:
-- ≤ --.

Signed and Sealed this
Eleventh Day of August, 2015

Michelle K. Lee
*Director of the United States Patent and Trademark Office*